June 14, 1955 F. W. PFISTER 2,710,571
GROUND WORKING OR GARDENING TOOLS
Filed Oct. 25, 1951
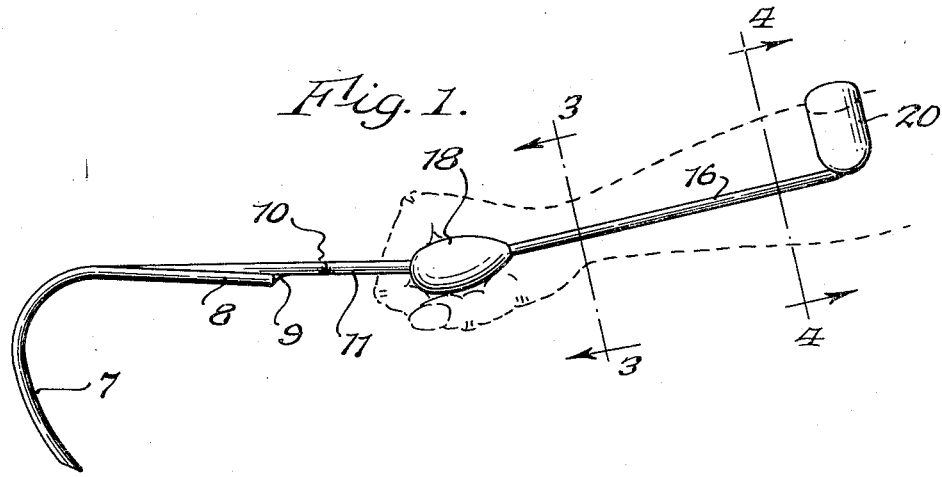
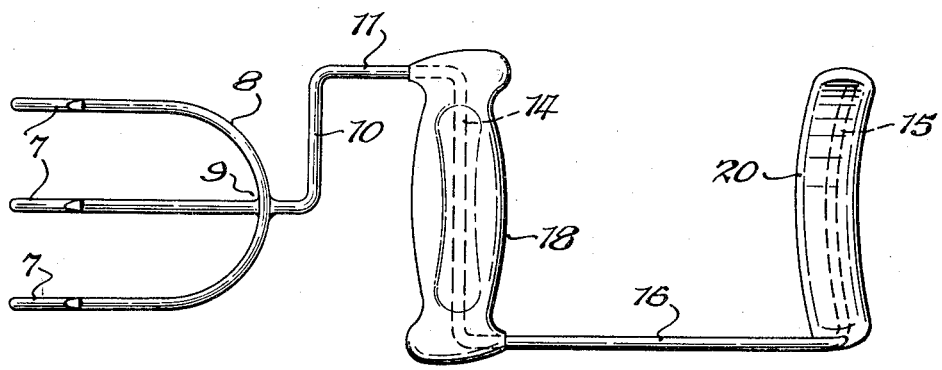
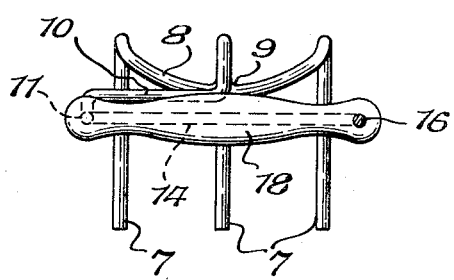
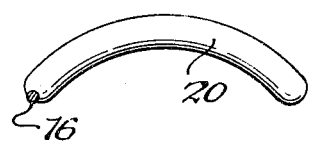
INVENTOR.
Frederick W. Pfister,
BY
Parker, Prochnow & Pennell,
Attorneys.

2,710,571
GROUND WORKING OR GARDENING TOOLS

Frederick W. Pfister, Allendale, N. J.

Application October 25, 1951, Serial No. 253,023

1 Claim. (Cl. 97—61)

This invention relates to ground working or gardening tools of the types having relatively short handles which are ordinarily grasped by a hand of the user.

Hand gardening tools of this type generally have a handle which extends rearwardly from the tool and which must be grasped firmly by the hand of the user to hold the tool in various positions and also to exert the necessary pressure on the tool to cause the same to penetrate the ground. Tools of this kind are difficult to work with because of the force which must at times be exerted on the handle, which, consequently, is very tiring on the arms, wrists and hands of the users.

One of the objects of this invention is to provide a ground working or gardening tool provided with a handle portion which is so formed as to greatly facilitate the use of the tool. Another object is to provide a tool of this kind with a handle which has a hand grip extending crosswise of the length of the handle and a portion formed to rest on the upper surface of the arm of the user to facilitate applying pressure to the tool to cause the same to penetrate the ground.

Other objects and advantages will be apparent from the following description of one embodiment of the invention and the novel features will be particularly pointed out hereinafter in connection with the appended claim.

In the accompanying drawings, which show by way of example a tool according to my invention:

Fig. 1 is a side elevation of a ground working gardening tool embodying this invention and showing in broken lines the hand and arm of a user of the tool.

Fig. 2 is a bottom plan view of the tool shown in Fig. 1.

Fig. 3 is a transverse section thereof, on line 3—3, Fig. 1.

Fig. 4 is a transverse sectional view thereof, on line 4—4, Fig. 1.

The tool may have a ground working device of any suitable or desired type, such for example, as a hoe, rake, cultivator or the like. In the particular construction illustrated by way of example, I have provided a ground working device consisting of three hooks 7 with pointed ends to form a rake or cultivating tool. The outer two hooks are formed at the ends of a U-shaped wire or rod member 8, and the middle hook is formed as an integral portion of the handle of the tool, the U-shaped portion being suitably secured to the handle portion, for example, by means of welding as indicated at 9.

The handle is made of a single rod of steel or other suitable material which extends from the ground working device rearwardly to a limited extent and terminates at a bend to form a part 10 extending toward one side of the tool and which terminates at its outer end in a rearwardly extending portion 11. The wire or rod of which the handle is made is then bent into substantially U-shape, the U-shaped part of the handle including a transversely extending leg 14 arranged adjacent to the ground working device and a second laterally extending leg 15 spaced from the first leg, the two legs being connected by means of a longitudinally extending integral part 16. The leg 14 of the U-shaped part of the handle is formed to be grasped by the hand of the user of the tool and the rear leg 15 of the U-shaped part of the tool is formed to bear against the upper surface of the arm of the user, this leg being shown in broken lines in Fig. 1. As a result of this formation of the handle, it will be obvious that the ground working device of the tool may be easily forced into the ground merely by downward pressure of the hand upon the leg 14. This downward pressure results in a corresponding downward force on the leg 15 of the handle which bears on the forearm of the user. Consequently, the user is only required to exert downward pressure with his hand on the leg 14 and is not required to take a tight grip on the handle in order to force the ground working device into the ground. Also by having the hand grip extending transversely of the tool, and having the leg 14 extending laterally to substantially equal distances from an extension of the longitudinal center or axis of the ground working device, any tendency of the ground working device to tilt or turn about the longitudinal axis of the tool is easily opposed by the user.

The handling of the tool may, of course, be facilitated by providing the leg 14 of the rod with a hand grip 18 of any suitable or desired form. The hand grip may, for example, be made of plastic material molded on the handle of the tool by locating the leg member 14 and adjacent parts of the handle in a die of a molding machine, and molding the grip 18 about the leg 14 and about adjacent portions of the parts 11 and 16 of the handle. The outer shape or contour of the handle may be of any suitable or desired kind. The handle, of course, could also be made of two parts of wood or plastic material fitted on the leg 14 of the handle and secured thereto in any desired manner.

A similar enlargement of the leg 15 is desired so that the pressure exerted on the upper surface of the forearm may be distributed over a relatively large surface so as to avoid any discomfort caused by the pressure exerted on the forearm. For this purpose, in the first place, the leg 15 may be arc-shaped in such a manner as indicated in Fig. 4, to correspond approximately to the curvature of the upper surface of the forearm with which this part of the handle engages. In addition to the arc-shape form of the leg 15, a pad or enlargement 20 may be provided on the arc-shaped leg 15 in any suitable or desired manner, for example, in the same manner as used in applying the hand grip 18 to the leg 14, namely, by molding the pad 20 of plastic material on the leg 15. Preferably the pad 20 is made of greater dimension horizontally than vertically so as to form an extended bearing surface against the forearm of the user.

When the tool is used, and grasped as indicated in Fig. 1, it does not tire the wrist of the user, even after long continued use, and persons with weak wrists may use the tool effectively. In tools of this type, as heretofore made, in which the handle extended lengthwise of the tool, downward pressure on the handle to force the ground working device into the soil resulted in a lever action on the handle tending to force the rear end of the handle downwardly, and this lever action had to be opposed by the hand which was also required to force the tool into the soil. By means of the construction described, the downward force acting on the rear end of the handle is taken care of by the forearm so that the hand and wrist of the user are only necessary to exert the downward force on the ground working device. Furthermore lengthwise movement of the tool to effect a plowing or cultivating action is effected by a straight, rearward pull on the leg 14, which can easily be effected by the fingers without tightly gripping the handle portion 18 and with substantially no reaction on the leg 15, whereas with tools in which the handle extends lengthwise of the tool, the handle must be gripped tightly enough to exert sufficient friction between the hand and the handle to enable the tool to be moved lengthwise.

It will be understood that various changes in the details, materials, and arrangements of parts which have been herein described and illustrated in order to explain the nature of the invention, may be made by those skilled in the art within the principle and scope of the invention, as expressed in the appended claim.

I claim as my invention:

A gardening tool comprising a ground working device comprising a plurality of teeth, and a handle portion formed of a single rod secured to said device at the longitudinal, central axis thereof, said rod having a part thereof extending rearwardly from said ground working device and bent into substantially U-shape with one leg extending transversely of said tool in rearwardly spaced relation thereto and extending approximately equal distances from the central axis of said ground working device to receive downward pressure and pull from the hand of the user of the tool, and another leg spaced rearwardly from said first mentioned leg and extending transversely of the length of the tool in position to lie on the front of the forearm of the user to press downwardly on the arm when downward pressure is exerted on the first mentioned leg to press the ground working device into the ground, and a hand grip secured to said first mentioned leg.

References Cited in the file of this patent

UNITED STATES PATENTS

| | | |
|---|---|---|
| 325,775 | Terpening | Sept. 8, 1885 |
| 1,262,482 | Hales | Apr. 9, 1918 |
| 1,811,604 | Bancroft | June 23, 1931 |
| 1,985,674 | Bauer | Dec. 25, 1934 |
| 2,028,001 | Moran | Jan. 14, 1936 |
| 2,575,681 | Peters | Nov. 20, 1951 |

FOREIGN PATENTS

| | | |
|---|---|---|
| 927,264 | France | Apr. 28, 1947 |
| 122,358 | Sweden | July 27, 1948 |